(12) United States Patent
Georis

(10) Patent No.: US 8,850,796 B2
(45) Date of Patent: Oct. 7, 2014

(54) SYSTEM TO DETECT ANOMALOUS FLUIDS IN AN SCR SYSTEM

(75) Inventor: Philippe Lucien Valmy Georis, Chelles (FR)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 284 days.

(21) Appl. No.: 13/518,681

(22) PCT Filed: Dec. 8, 2010

(86) PCT No.: PCT/EP2010/069176
§ 371 (c)(1),
(2), (4) Date: Sep. 26, 2012

(87) PCT Pub. No.: WO2011/076571
PCT Pub. Date: Jun. 30, 2011

(65) Prior Publication Data
US 2013/0037138 A1    Feb. 14, 2013

(30) Foreign Application Priority Data

Dec. 24, 2009  (EP) .................................... 09180734

(51) Int. Cl.
*F01N 3/00* (2006.01)
*F01N 3/20* (2006.01)
*G01F 23/00* (2006.01)
*G01F 23/74* (2006.01)

(52) U.S. Cl.
CPC ....... *F01N 3/2066* (2013.01); *F01N 2900/1814* (2013.01); *Y02T 10/24* (2013.01); *G01F 23/0015* (2013.01); *F01N 2900/1811* (2013.01); *F01N 2900/1818* (2013.01); *F01N 2610/02* (2013.01); *G01F 23/0076* (2013.01); *F01N 2610/1406* (2013.01); *G01F 23/74* (2013.01)

USPC ................. 60/277; 60/301; 137/551; 73/311; 73/314

(58) Field of Classification Search
CPC ............. F01N 3/2066; F01N 2610/02; F01N 2610/1406; F01N 2900/1811; F01N 2900/1818; F01N 2900/1814; G01F 23/0015; G01F 23/0076; G01F 23/74; Y02T 10/24
USPC ............. 60/272–324; 73/440, 292, 306–308, 73/311; 340/449–450, 624
See application file for complete search history.

(56) References Cited

U.S. PATENT DOCUMENTS

| 2,536,273 A | 1/1951 | Gahagan |
| 3,935,741 A | 2/1976 | Zinsmeyer et al. |

(Continued)

FOREIGN PATENT DOCUMENTS

| CA | 2 393 300 | 12/2002 |
| EP | 0 949 487 | 10/1999 |
| WO | 2009 146308 | 12/2009 |

OTHER PUBLICATIONS

International Search Report Issued Feb. 24, 2011 in PCT/EP10/069176 Filed Dec. 8, 2010.

*Primary Examiner* — Jesse Bogue
(74) *Attorney, Agent, or Firm* — Oblon, Spivak, McClelland, Maier & Neustadt, L.L.P.

(57) ABSTRACT

A system for a fluid tank for storing a urea solution in a motor vehicle, the system including a first float having a first density and a second float having a second density, the first and second floats being movably arranged on a guide in the fluid tank, the first density is less than a density of the urea solution at a reference temperature but greater than a density of water at the reference temperature, and the second density is less than the density of water at the reference temperature. The system further includes a control system configured to receive signals indicative of a level of the floats, and to generate an anomaly signal in response to detecting sinking of the first float and floatation of the second float.

15 Claims, 2 Drawing Sheets

(56) References Cited

U.S. PATENT DOCUMENTS

| | | | |
|---|---|---|---|
| 5,347,864 A * | 9/1994 | Senghaas et al. | 73/313 |
| 5,400,253 A * | 3/1995 | O'Connor | 701/123 |
| 7,216,537 B2 * | 5/2007 | Margolin et al. | 73/314 |
| 7,454,969 B2 * | 11/2008 | Hart | 73/306 |
| 2007/0113544 A1 * | 5/2007 | Nishina et al. | 60/286 |
| 2007/0266703 A1 * | 11/2007 | Hirata et al. | 60/299 |
| 2008/0098726 A1 | 5/2008 | Donaldson et al. | |
| 2008/0178575 A1 * | 7/2008 | Shaikh et al. | 60/274 |

\* cited by examiner

*Figure 3a*  *Figure 3b*  *Figure 3c*
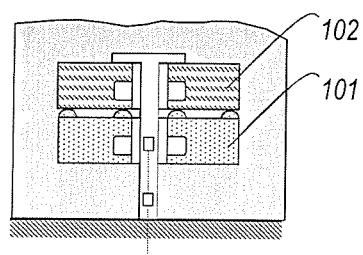
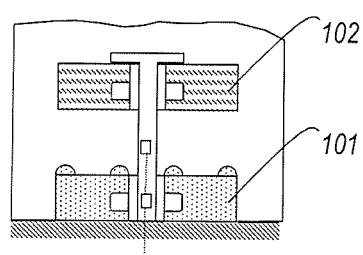
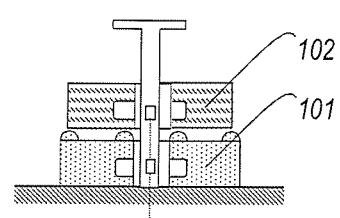
*Figure 4*
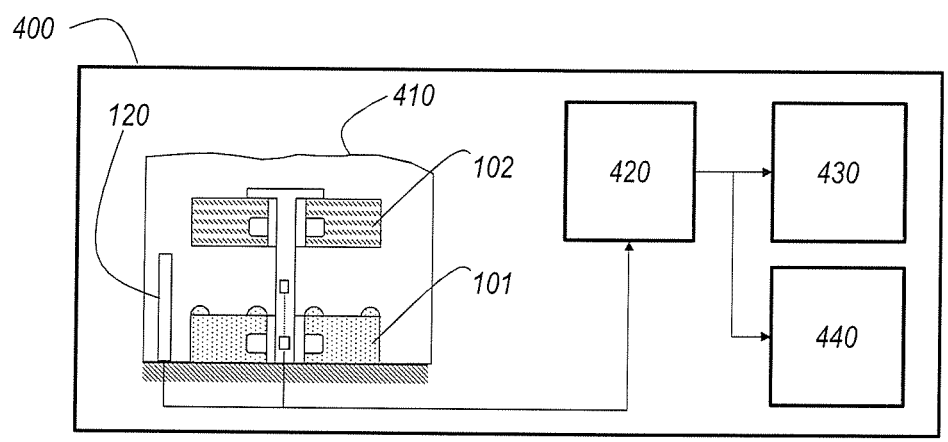

SYSTEM TO DETECT ANOMALOUS FLUIDS IN AN SCR SYSTEM

The present invention relates to a float-based system for discriminating densities of fluids, with floats being movably arranged on guiding means in a fluid tank. More particularly, the present invention relates to such a system for use with vehicular urea tanks, to a tank for use in such a system, and to motor vehicle equipped with such a system.

U.S. Pat. No. 3,935,741 describes a system to detect the presence of a certain amount of condensed water in a gasoline tank, such as an underground gasoline tank, by detecting a hydrostatic force exerted on two floats, a first one of which is adapted to float on gasoline, forming the upper layer of liquid in the tank, and a second one of which is adapted to float on water, if present, forming the lower layer of liquid in the tank.

The idea behind the present invention is to use the principle of density discrimination using floats as described in this document, but for another purpose, namely: for checking the quality of the liquid fed to a tank for storing a urea solution for use as an ammonia precursor in a selective catalytic reduction (SCR) process, which is commonly used to reduce emissions from diesel engines.

The present invention therefore provides in a first aspect, a system for a fluid tank for storing a urea solution in a motor vehicle, said system comprising a first float having a first density and a second float having a second density, and being located above said first float, said first and second floats being movably arranged on guiding means in said fluid tank, wherein said first density is less than a density of said urea solution at a reference temperature but greater than a density of water at said reference temperature, and said second density is less than said density of water at said reference temperature, and wherein said system further comprises a control system adapted to receive signals indicative of a level of said floats, said control system being further adapted to generate an anomaly signal in response to detecting sinking of said first float and floatation of said second float.

The invention is based on the insight that a vehicular urea tank is susceptible to being filled with a fluid other than the desired urea solution, such as water or a diluted urea solution, either by accident or on purpose. The presence of an anomalous fluid in the tank is likely to cause a malfunction of the SCR system. This will in turn lead to a higher level of $NO_x$ emission than foreseen by the car manufacturer, or indeed to a level that exceeds the maximum level imposed by the applicable regulations. For those reasons, the system of the present invention provides floats with densities which are selected to discriminate between the presence of the desired urea solution and the presence of a lower-density fluid such as water. This is in contrast to the system of U.S. Pat. No. 3,935,741, which would not be capable of discriminating between a urea solution and water, because the detection means coupled to the lowermost float will react to both in the same way.

In an embodiment, the system of the present invention further comprises a temperature sensor, wherein the control system is further adapted to receive signals indicative of a temperature sensed by the temperature sensor, and to further generate an anomaly signal when said temperature is outside a predetermined range around said reference temperature.

This embodiment of the invention is based on the additional insight that vehicular fluid tanks may be exposed to great temperature fluctuations. For that reason, the system of the invention is equipped with a temperature sensor, which allows for a more accurate interpretation of the level information pertaining to the floats. In particular, the temperature information may indicate that the present temperature is below the freezing point of the fluid which one or each of the floats is designed to react to, in which case the level of the float in question cannot be relied on.

In an embodiment of the system of the present invention, the control system is further adapted to reduce the operability of the motor vehicle when the anomaly signal is generated.

It is an advantage of this embodiment that excessive $NO_x$ emissions are prevented, by reducing the operation of the engine when no correct urea solution is present to carry out the SCR process.

In a particular embodiment, the control system is further adapted to inhibit starting of an engine of the motor vehicle when the anomaly signal is generated.

In another particular embodiment, the control system is further adapted to present a warning signal to a driver of said motor vehicle when the anomaly signal is generated.

In yet another particular embodiment, the control system is further adapted to prevent exceeding by said motor vehicle of a predetermined speed when the anomaly signal is generated. In a more particular embodiment, the control system is further adapted to prevent exceeding by said motor vehicle of a predetermined speed when said anomaly signal is generated and a predetermined distance has subsequently been traveled.

In an embodiment of the system of the present invention, the urea solution is substantially a solution comprising 32.5% of urea in water.

It is an advantage of this embodiment that it may be directed to the use of the known eutectic solution of urea in water, which is commercially available and used on a wide scale in presently installed SCR systems. This solution is described in ISO 22241-1, and has a known density of 1080 $kg/m^3$.

According to another aspect of the invention, there is provided a motor vehicle comprising the system as described above.

According to yet another aspect of the invention, there is provided a fluid tank for storing a urea solution in a motor vehicle, the tank comprising a guiding means, a first float having a first density and a second float having a second density, said first and second floats being movably arranged on said guiding means, wherein said first density is less than a density of said urea solution at a reference temperature but greater than a density of water at said reference temperature, and said second density is less than said density of water at said reference temperature, for use in the system described above.

In an embodiment, the fluid tank of the present invention further comprises a temperature sensor.

According to yet another aspect of the invention, there is provided a program for a control system, adapted to process signals indicative of a level of a first float having a first density and of a second float having a second density, said first and second floats being movably arranged on guiding means in a fluid tank, wherein said first density is less than a density of said urea solution at a reference temperature but greater than a density of water at said reference temperature, and said second density is less than said density of water at said reference temperature, said program producing an anomaly signal in response to detecting sinking of said first float and floatation of said second float.

In an embodiment, the program according to the present invention is further adapted to process signals indicative of a temperature sensed by a temperature sensor, said program further producing an anomaly signal when said temperature is outside a predetermined range around said predetermined reference temperature.

These and other embodiments of the present invention, will be further described and illustrated in reference to the following figures, in which:

FIGS. 3a-3c illustrate the principle of anomalous fluid detection as performed by embodiments of the present invention;

FIG. 4 provides a schematic illustration of an embodiment of the system according to the present invention.

Laws governing passenger and utility vehicle emissions require, in part, a reduction of the amount of nitrogen oxide ($NO_x$) released into the atmosphere. This goal may be achieved by the SCR process, which serves to reduce the nitrogen oxides by injecting a reducing agent, generally ammonia, into the exhaust line. This ammonia may be produced by the thermolytic decomposition of a solution of an ammonia precursor, the concentration of which may be eutectic. Such an ammonia precursor can be a urea solution.

Urea solutions are commercially available, inter alia under the form of a eutectic aqueous solution, as described in ISO 22241-1, which has a known density of 1080 kg/m^3 at 20° C. A commercially available product of this type is known as AdBlue.

With the SCR process, the $NO_x$ produced in the engine during combustion at optimized efficiency are treated at the engine outlet in a catalyst. This treatment requires the use of the reducing agent in a precise concentration and in an extremely high quality. The solution is thus accurately metered and injected into the exhaust gas stream, where it is hydrolyzed, before converting the $NO_x$ into molecular nitrogen ($N_2$) and water ($H_2O$).

For this purpose, a vehicle 400 may be equipped with a tank 410 containing an aqueous urea solution and with a device for metering and injecting the desired quantity of additive into the exhaust line.

This technique allows the vehicle 400 to comply with existing and future environmental regulations regarding exhaust pipe emissions.

If the quality of the reducing agent is not appropriate, the catalytic conversion of $NO_x$ to nitrogen and water will not be effective and the exhaust emissions may exceed regulatory maxima. This may occur when the urea tank 410 is filled with another fluid than the appropriate urea solution, such as water, or a more diluted urea solution. It is important to ensure that the vehicle 400 always operates with the proper quality reducing agent.

Figure 1:
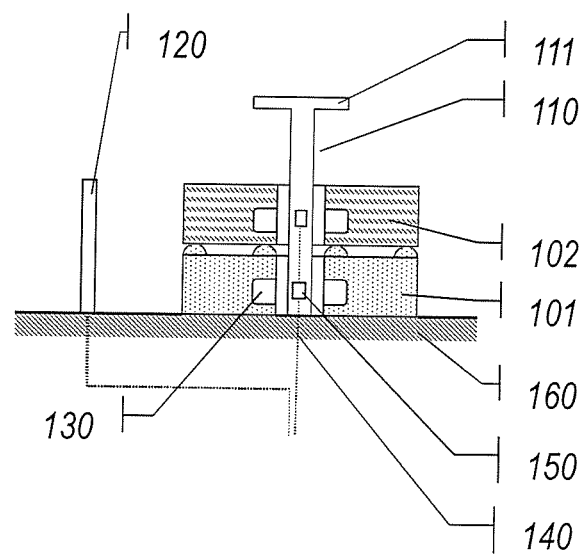
FIG. 1 illustrates components of a system according to an embodiment of the present invention.
Figure 2:
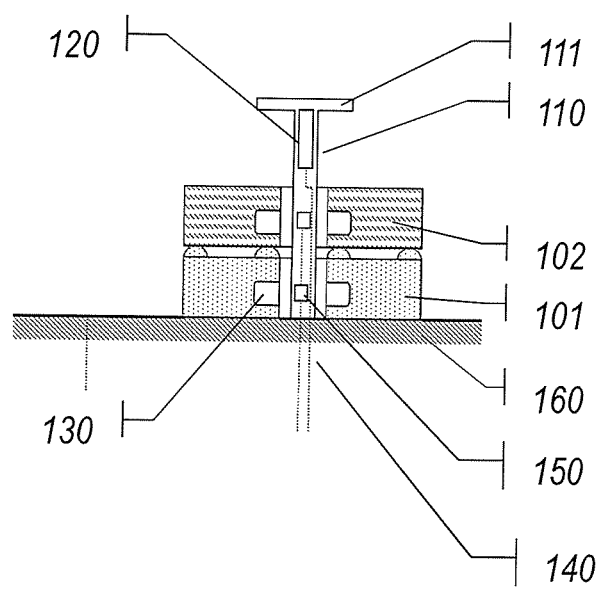
FIG. 2 illustrates components of a system according to another embodiment of the present invention.

In an embodiment of the system according to the present invention, the urea tank 410 is equipped with the components shown in FIG. 1. A fluid detector is provided, consisting of a first float 101 and a second float 102, both floats being arranged on guiding rod 110, which may be equipped with a stopper 111 to limit the vertical travel range of the floats 101, 102. A temperature sensor 120 is provided in the vicinity of the fluid detector. In a particular embodiment of the system according to the present invention, shown in FIG. 2, the temperature sensor 120 is included inside the guiding rod 110.

The floats 101, 102 are designed to have densities which allow a faithful discrimination between the presence of the desired urea solution, and the presence of fluids with a lesser density, notably water or water-urea solutions with a water content exceeding the eutectic concentration. This implies that the density $D_1$ of the first float 101 and the density $D_2$ of the second float 102 should both be less than the density $D_u$ of the desired urea solution, such that both floats 101, 102 will float when liquid urea solution is present in the tank 410. In addition, the density $D_1$ of the first float 101 should be greater than the density $D_{H2O}$ of water, to ensure that the first float 101 will not float when water is present in the tank 410. The density $D_2$ of the second float 102, on the other hand, should be less than $D_{H2O}$, to ensure that the second float 102 will float when water is present in the tank 410.

In reference to FIG. 3, we may now conclude that the floats 101, 102 with densities as described above, will display the following behavior. If the desired urea solution is present in the tank 410, both the first float 101 and the second float 102 will undergo floatation due to the buoyant force caused by the solution, resulting in the situation illustrated in FIG. 3a. If water is present in the tank 410, the resulting buoyant force will be sufficient to overcome the weight of the second float 102, but not that of the first float 101, resulting in the situation of FIG. 3b. If the tank 140 is empty of liquids, both floats will remain seated against the bottom 160 of the tank or the other float, as illustrated in FIG. 3b. It is thus clear that the described fluid detector is capable of discriminating between the presence of the desired urea solution and the presence of water, and additionally of detecting an empty tank situation.

It must be noted that it may be desirable to detect not only water, but any other liquid with a density which is detectably lower than that of the desired urea solution. This may be achieved by choosing $D_1$ only very slightly lower than $D_u$, ensuring that the first float 101 will remain in its lower position unless surrounded by a fluid with substantially the density of the desired urea solution.

The level of the floats 101, 102 may be relayed to a control system 420 by means of a combination of a magnet 130 inside the floats 101, 102, and magnetic switches 150 inside the guiding rod 110. Depending on the type of the magnetic switches 150, the presence of the respective floats 101, 102 at the level of the switches causes the switches to open or close, which change can easily be detected, relayed by means of wiring 140, and used by appropriate electronic circuitry such as control system 420.

Provided the stopper 111 is put at the maximum fill level or above, and provided there are enough switches 150 on the guiding rod 110, the system of the invention can advantageously be used both as quality control gauge and as a level gauge. This embodiment can be applied both to gauges equipped with Reed switches and to Hall Effect gauges.

Likewise, the output of the temperature sensor 120 may be relayed to the control system 420 by means of wiring 140.

The control system 420 aggregates the information about the levels of the floats 101, 102, and the temperature sensed by temperature sensor 120, to determine whether the condition of the urea solution tank is normal or anomalous. In this context, a normal condition is a condition in which both floats 101, 102 are floating, as illustrated in FIG. 3a, indicating that there is an amount of fluid present in the tank 410, and that this amount of fluid presents a density of at least $D_u$, which may be taken to imply that the tank 410 is filled with the desired urea solution. As an additional condition, it should be checked whether the temperature sensed by temperature sensor 120 is in excess of the freezing temperature of the desired urea solution, which is around −11° C. for a eutectic aqueous urea solution. Below this temperature, the "floating" position of the floats 101, 102 may be due to the fact that the floats 101, 102 are stuck to the guiding rod 110 by frost, rather than to the buoyant force caused by a surrounding fluid. In these low temperature conditions, the SCR system is not likely to function correctly, and hence the control system 420 should preferably not consider the conditions to be normal.

In addition to the extreme low-temperature situations, the control system 420 should also consider the situations illustrated in FIGS. 3b-3c as anomalous. FIG. 3b represents the situation where the tank 410 is filled with a fluid other than the desired urea solution, which provides no guarantee whatsoever that the SCR system would be capable of operating normally. FIG. 3c represents the situation where the tank 410 is substantially empty, which will also prevent the SCR system from operating correctly.

If an anomalous situations as described above is detected, the control system 420 will generate an anomaly signal, which may inter alia be used for the purposes described below.

Referring to FIG. 4, control system 420 of the motor vehicle 400 is shown to be connected to a warning signal 430, an engine 440, or both.

The warning signal 430 may be of any of the known types of warning signals for alerting a driver of a vehicle-related condition, including auditory signals such as beeps, or visual signals such as a gauge, a flashing light or a steady light.

The connection to the engine 440 is provided to implement a limitation to the operability of the motor vehicle 400 in response to the detection of the anomaly. In an embodiment, the motor vehicle 400 is adapted to inhibit starting of the engine 440 when the anomaly signal is generated. In another embodiment, the motor vehicle 400 is adapted not to exceed a predetermined speed when said anomaly signal is generated. In a particular embodiment, the motor vehicle 400 is adapted not to exceed the predetermined speed when the anomaly signal is generated and a predetermined distance has subsequently been traveled. This distance may be around 50 km, allowing for a minimal usability of the vehicle in emergency situations, despite the lack of SCR operation.

Although the invention has been described above in relation to various embodiments thereof, these embodiments serve as examples and do not limit the invention, the scope of which is defined by the enclosed claims and their legal equivalents.

The invention claimed is:

1. A system for a fluid tank for storing a urea solution in a motor vehicle, said system comprising:
   a first float having a first density; and
   a second float having a second density,
   said first and second floats being movably arranged on guiding means in said fluid tank,
   wherein said first density is less than a density of said urea solution at a reference temperature but greater than a density of water at said reference temperature, and said second density is less than said density of water at said reference temperature, and
   wherein said system further comprises a control system configured to receive signals indicative of a level of said floats, and further configured to generate an anomaly signal in response to detecting sinking of said first float and floatation of said second float.

2. The system of claim 1, further comprising a temperature sensor, wherein said control system is further configured to receive signals indicative of a temperature sensed by said temperature sensor, and to further generate an anomaly signal when said temperature is outside a predetermined range around said reference temperature.

3. The system of claim 1, wherein said control system is further configured to reduce operability of said motor vehicle when said anomaly signal is generated.

4. The system of claim 3, wherein said control system is further configured to inhibit starting of an engine of said motor vehicle when said anomaly signal is generated.

5. The system of claim 3, wherein said control system is further configured to present a warning signal to a driver of said motor vehicle when said anomaly signal is generated.

6. The system of claim 3, wherein said control system is further configured to prevent said motor vehicle exceeding a predetermined speed when said anomaly signal is generated.

7. The system of claim 3, wherein said control system is further configured to prevent said motor vehicle exceeding a predetermined speed when said anomaly signal is generated and a predetermined distance has subsequently been traveled.

8. The system of claim 1, wherein said urea solution is substantially a solution comprising 32.5% of urea in water.

9. A motor vehicle comprising the system of claim 1.

10. A fluid tank for storing a urea solution in a motor vehicle, said tank comprising:
    a guiding means;
    a first float having a first density; and
    a second float having a second density,
    said first and second floats being movably arranged on said guiding means,
    wherein said first density is less than a density of said urea solution at a reference temperature but greater than a density of water at said reference temperature, and said second density is less than said density of water at said reference temperature, configured for use in the system of claim 1.

11. The fluid tank of claim 10, further comprising a temperature sensor.

12. A non-transitory computer readable medium including computer executable instructions to be executed by a control system, configured to:
    process signals indicative of a level of a first float having a first density and of a second float having a second density, said first and second floats being movably arranged on guiding means in a fluid tank,
    wherein said first density is less than a density of a urea solution at a reference temperature but greater than a density of water at said reference temperature, and said second density is less than said density of water at said reference temperature; and
    to produce an anomaly signal in response to detecting sinking of said first float and floatation of said second float.

13. The non-transitory computer readable medium of claim 11, the control system further configured to process signals indicative of a temperature sensed by a temperature sensor, and to produce an anomaly signal when said temperature is outside a predetermined range around said predetermined reference temperature.

14. A method of use of the system according to claim 1, comprising: using the system both as a quality control gauge and as a level gauge.

15. The method of use according to claim 14, wherein said system comprises Reed switches or comprises a Hall Effect sensor.

* * * * *